ical Industries
United States Patent [19]
Bentley et al.

[11] 3,963,848
[45] June 15, 1976

[54] FLEXIBLE COATED SHEET MATERIAL

[75] Inventors: John Bentley, Maidenhead; Brian Robert Letchford, Flackwell Heath; Thomas Whitehead Stafford, Hyde, all of England

[73] Assignee: Imperial Chemical Industries Limited, London, England

[22] Filed: Mar. 15, 1974

[21] Appl. No.: 451,691

[30] Foreign Application Priority Data
Mar. 26, 1973 United Kingdom............... 14348/73

[52] U.S. Cl................................. 428/172; 128/90; 427/53; 427/54; 427/270; 428/203; 428/913
[51] Int. Cl.$^2$.............................................. B32B 3/00
[58] Field of Search................ 117/37 R, 44, 45, 93, 117/93.3, 93.31, 161 UZ, 161 UH; 128/90; 427/53–56, 256, 258, 270, 271, 288; 428/172, 195, 201, 203, 211, 500, 511, 514, 521–523, 537, 913

[56] References Cited
UNITED STATES PATENTS

| | | | |
|---|---|---|---|
| 3,453,171 | 7/1969 | Crowley | 117/93.31 X |
| 3,499,781 | 3/1970 | Krueckel | 117/93.31 X |
| 3,519,527 | 7/1970 | Crowley | 117/93.31 X |
| 3,625,744 | 12/1971 | Juna et al. | 117/93.31 |
| 3,664,861 | 5/1972 | Okamura et al. | 117/93.31 |
| 3,692,560 | 9/1972 | Rosenkranz | 117/93.31 |
| 3,759,809 | 9/1973 | Carlick et al. | 117/93.31 X |
| 3,827,958 | 8/1974 | McGinniss | 117/93.31 X |
| 3,840,390 | 10/1974 | Kozu et al. | 117/93.31 |
| 3,874,376 | 4/1975 | Dart et al. | 128/90 |
| 3,881,473 | 5/1975 | Corvi et al. | 128/90 |

FOREIGN PATENTS OR APPLICATIONS

| | | | |
|---|---|---|---|
| 870,150 | 5/1971 | Canada | 128/90 |

*Primary Examiner*—Thomas J. Herbert, Jr.
*Assistant Examiner*—Bruce H. Hess
*Attorney, Agent, or Firm*—Cushman, Darby & Cushman

[57] ABSTRACT

A flexible sheet material provided with a flexible coating of an organic material which is curable on exposure to actinic light to produce a less flexible coating on the sheet. The coated sheet is rolled up for storage in the absence of actinic light such that when the sheet is unrolled and attached to a wall or other surface so exposing the coating to actinic light, a less flexible coating on the sheet results.

5 Claims, No Drawings

FLEXIBLE COATED SHEET MATERIAL

This invention relates to a flexible coated sheet material.

According to the present invention we provide a flexible sheet material provided with a flexible coating of an organic material which is curable on exposure to actinic light or produce a less flexible, and more preferably, an inflexible coating on the sheet.

Before the coating is cured, the coated sheet material is desirably sufficiently flexible to allow it to be rolled up, in a similar fashion to a wallpaper, for storage purposes without damage to the curable coating. In any event the coated sheet material will be capable of being folded or deformed to accord with a curved or otherwise shaped support surface, for example a wall, to which the sheet material can be attached through the medium of a suitable adhesive. Furthermore the sheet material can be cut using a suitable instrument, for example scissors of a knife, along a clean cut line.

Essentially, as the coating on the sheet material is rendered less flexible by exposure to actinic light, it is necessary to store the flexible sheet in the dark. Whilst the mere rolling up of the coated sheet material with the coating innermost, will conceal the majority of the coating from actinic light, nevertheless, it is usual to store the sheet material, whether rolled up or otherwise, in the dark, for example in an opaque bag or other container.

By curable organic material we mean a flexible organic material which is capable of reacting to produce a less flexible material.

By actinic light we mean light which is effective in causing a reaction and may be ultra violet light or visible light. By ultra violet light we mean light having a wavelength in the range 2,500 A to 4,000 A and by visible light we mean light having a wavelength in the range 4,00 A to 8,000 A.

Any suitable flexible sheet material may be used in the invention. Typical materials are woven or 0.015 fabrics, felted materials, plastic sheets or papers. The sheet material may utilise a paper sheet which contains only cellulosic fibres but the paper sheet can, if desired, contain a blend of cellulosic fibres with artificial fibres, e.g. nylon, rayon or acrylic fibres. It may also contain fillers, pigments, resins or other additives commonly used in paper manufacture. The paper sheet should be sufficiently strong to provide the coated sheet material with adequate tear strength and dimensional stability and a paper sheet having a thickness up to 0.065 centimeters, for example, from 0.015 cm to 0.065 cm and preferably from 0.015 cm to 0.03 cm is conveniently used. The paper itself may be produced from chemical wood pulp or it may be desirable, for economic reasons, to produce the paper from either a mechanical wood pulp or a mixture of mechanical and chemical wood pulp containing, for example, up to 85% weight of mechanical wood pulp. If desired the paper may be provided with a pigmented ground cout.

If desired an aluminium or other heat conductive foil may be laminated to the flexible sheet material before the coating is applied thereon in order to improve heat dissipation in the coated sheet material should the coating be required to withstand heat as may be the case if hot cooking utensils are placed on the coated sheet material.

Any organic material which can be converted from a flexible, rubbery, state to a hard, less flexible state by exposure to actinic light is generally suitable as the coating material. Desirably, and particularly when the sheet material is being used as a decorative laminate, the cured organic materal should also possess the usual properties associated with surface coatings such as durability, toughness and resistance to abrasive wear, biological and chemical attack, dirt, heat and moisture.

In order to achieve the above properites it is necessary to provide a continuous coating having a thickness in excess of 0.0025 centimeters.

In the invention the organic material is a blend of a thermoplastic polymer and one or more ethylenically unsaturated materials which are capable of being polymerised by free radical addition polymerisation in the presence of a photosensitive catalyst on exposure of the blend to actinic light. The thermoplastic polymer and unsaturated material are intimately combined in a liquid blend so that the unsaturated material plasticises the polymer in a similar manner to known plasticised polymeric compositions. The blend is applied as a coating on the flexible sheet material, the gelled or flexible state being attained by a physical process and not a chemical reaction. On exposure of the blend to actinic light, the monomeric unsaturated material is polymerised in situ so that the coating becomes a blend of two polymers with no plasticising low molecular weight material present and hence becomes inflexible.

Any thermoplastic polymer can be used in the blend provided that it is compatible with, and capable of being plasticised by, the monomer.

Examples of suitable thermoplastic polymers are the usual vinyl homopolymers and copolymers known in the art including polyvinyl chloride, polyvinylidene chloride and copolymers of vinyl chloride and vinyl acetate.

Examples of suitable photosensitive catalysts include: a diketone and a reducing agent (benzil and dimethyl amino ethyl methacrylate) α-carbonyl alcohols (benzoin); acyloin ethers (benzoin methyl ether); α-hydrocarbo-substituted acyloins; polynuclear quinones; alkyl disulphides; aralkyl disulphides; aryl disulphides; aroyl disulphides; acyl disulphides; cycloalkyl disulphides; mercaptans; thiols; dithiocarbonates; thioketones; O-alkyl xanthene esters; thiuram derivatives; peroxides; hydroperoxides; azonitriles; halogen compounds such as α- haloketones, chloro-bromo-, and iodo-acetic acids and sulphonyl chlorides; dyes/reducing agent; or a combination of any of the above such as a benzoin derivative and a peroxide. PS8 which is a photosensitive catalyst by Wako of Japan.

Any aliphatic or aromatic tertiary amine may be used as the reducing agent but for some applications, polymeric amino compounds such as poly (dimethyl amino ethyl methacrylate) or polymeric compounds containing a plurality of tertiary amine groups are preferred.

Examples of suitable ethylenically unsaturated materials include ethylenically unsaturated monomers such as vinyl monomers including, for example, vinyl esters, acrylic esters, aromatic vinyl compounds and vinyl nitriles.

Suitable vinyl esters include, for example, vinyl acetate and suitable acrylic esters include those having the formula $CH_2 = CR' - COOR$, where R is an alkyl, aryl, alkaryl, aralkyl or cycloalkyl group and R' is hydrogen or an alkyl group. For example, R may be an alkyl group having from 1 to 20, preferably 1 to 10 carbon atoms.

Polyfunctional ethylene monomers, that is monomers containing two or more ethylenically unsaturated groups are also suitable.

In preference, when the blend requires to be heated to convert it to the gelled state, we use a substantially involatile material. Substantially involatile monomers which can be used include hydroxy ethyl and hydroxy iso propyl (meth) acrylates, iso bornenyl (meth) acrylate, all (meth) acrylates of aliphatic alcohols with 6 or more carbon atoms, di - (meth) acrylates of polyols such as ethylene glycol and poly ethylene glycol, neo pentyl glycol, butane diol, (di-or tri-meth) acrylates of) trimethylol propane and diallyl phthalate.

In addition or alternatively the blend may contain other ethylenically unsaturated compounds providing that these are capable of plasticising the thermoplastic polymer in the manner previously described. For example compounds taken from the class of materials described as unsaturated polyesters may be used. Example of these have already been described above in relation to the previously described embodiments of the invention. Other oligomeric ethylenically unsaturated compounds which may be incorporated include formaldehyde condensates of amino and amido compounds including condensates of urea, melamine, substituted melamines, guanamine, ethylene urea and thiourea which have been further condensed with ethylenically unsaturated hydroxy compounds such as hydroxy ethyl (meth) acrylate and hydroxy propyl (meth) acrylate: acrylic resins containing methylol (meth) acrylamide which has been further condensed with hydroxy ethyl (meth) acrylate or hydroxy propyl (meth) acrylate: condensation products of di-or poly-functional isocyanates or isocyanate addiments and hydroxy ethyl (meth) acrylate or hydroxy propyl (meth) acrylate: and acrylic resins containing glycidyl (meth) acrylate which have been reacted with an ethylenically unsaturated acid such as (meth) acrylic acid and conversely acrylic resins containing acidic groups which have been reacted with glycidyl (meth) acrylate.

When the selected polymer is soluble then the blend may be formed as a solution in a suitable solvent. Though it will usually be highly viscous the solution can be applied as a coating on the flexible sheet material using the usual coating techniques. After the coating has been applied, the solvent is allowed to flash off, optionally by gentle heating, so that the coating becomes gelled. While there is little or no difficulty with monomer loss if an involatile monomer is used, the composition may still suffer from loss of efficiency of cure due to air inhibition and for this reason it may be preferable that after the solvent has been released, the coating is covered by a transparent foil for storage (in the dark) and subsequent cure of the coating.

Alternatively, the polymer/unsaturated material blend may be formed as a paste or a slurry or as an aquesus emulsion and applied as such on the sheet material. The coating may either gel on standing or may be gelled by the application of heat. As previously it may be necessary to avoid the effects of air inhibition by covering the coating with a suitable foil which can resist the temperatures required to achieve gelation.

In the use of an unsaturated material/polymer blend, we may use a polymer having small particle size, preferably less than one micron, which is quickly swollen by the monomer. The polymer/monomer blend is stirred to form a paste which is sufficiently free flowing that it can be applied as coating on the sheet material. The coating is gelled either by allowing it to stand (in the dark) at room temperature for an hour or two or by the application of heat (in the dark). As previously, in order to prevent air inhibition, it may be preferable to cover the coating with a transparent foil.

In an alternative and preferred method using a polymer/monomer blend we use a "paste" grade of polymer, usually polyvinyl chloride, that is a grade of polymer of fine particle size which has a structure such that the particles are not swollen appreciably by plasticising materials at room temperature, but will only imbibe these, so that the blend of polymer/unsaturated material gels when heated to an elevated temperature.

In the method the blend is applied as a coating on the sheet material and then heated until the coating gels. In order to avoid thermal polymerisation of the unsaturated material excessive heating has to be avoided. Again the applied coating is covered by a transparent foil to protect the coating before it is finally cured.

Whilst the coated sheet material of the invention is useful as a packaging material, in general it is of more interest as a sheet material for attaching through the medium of a suitable adhesive to a wall, floor, ceiling, table, shelf, kitchen unit surface or other working surface within the confines of a house, factory, office or place of amenity. Furthermore, the sheet materal may be usefully employed as a surfacing material in the construction of automobiles or domestic appliances or as a bookbinding material.

Desirably the appearance of the coated sheet material is enhanced by a suitable decoration. The sheet material may be decorated merely by providing a pigmented coating or, more desirably, by providing the coated sheet material with a printed and/or embossed design. When it is desired to provide the coated sheet material with a decorative, single or multicolour print then either the base sheet material or the coating can carry the print. It will, of course, be realised that if the base sheet material is printed then the coating of the organic material will have to be transparent. Otherwise the coating can contain any of the usual additives including pigments, antioxidants, antiozonants, fillers and ultra violet stabilisers. It should, of course, be realised that a particular pigment, filler or other additive may reduce the effectiveness of certain photosensitive catalysts which are rendered effective by visible light. Generally speaking, however, for a certain pigmented system, a suitable catalyst can be selected from the range of available photosenstive catalysts. However, in so far as the filler is concerned a particularly useful filler is $\beta$-chrystobolite which is very transparent to light of most wavelengths.

When it is desired to provide the coating with an embossed pattern then this can be achieved using suitable embossing rollers or plates when the state of the coating is such that it retains an impressed pattern. Essentially during the embossing process the coating should not be exposed to unnecessary actinic light otherwise premature curing of the coating will occur.

It will be realised that decorative sheet materials according to the invention offer considerable advantage over the inflexible decorative laminates which are currently available. Of necessity, inflexible decorative laminates cannot be rolled up and so have to be sold in sheet form: they cannot be shaped in any way to the contours of a working surface: they are difficult to cut. The present invention avoids all of these difficulties by providing a flexible coated sheet material which can be rolled up for storage purposes: which can be easily cut: is sufficiently flexible to allow it to be attached to a non-planar working surface: and which can be rendered less flexible and more preferably inflexible after the sheet has been attached to a support surface by curing the coating.

The invention will now be described with reference to the following Examples in which all parts are by weight. (For ease of description no reference is made in these Examples to the usual additives which would be used in the compositions described or to the decoration of the coated sheet materials with a printed and/or embossed pattern).

EXAMPLE 1

A solution having the following composition was produced:-

| | |
|---|---|
| Polyvinyl chloride (*Corvic S46/70) | 25 parts |
| Tetraethylene Glycol Dimethylacrylate | 10 parts |
| Benzil | 0.03 parts |
| Triethanolamine | 0.03 parts |
| Acetone | 65 parts |
| *Corvic is a Registered Trade Mark of Imperial Chemical Industries Limited. | |

The highly viscous solution was applied, as a 0.012 inch thick layer, on to a typical wallpaper base and the solvent (acetone) allowed to flash off. Though not essential, gentle heat may be applied to assist in the "flashing off" of the solvent.

While there is little or no difficulty with monomer (Tetraethylene Glycol Dimethylacrylate) loss from the coating because of the involatility of the monomer, the coating suffers from loss of efficiency of cure during storage due to air inhibition and for this reason it is preferable, after the solvent has been released, that a transparent foil of, for example, polyethylene is laminated to the coating.

The coated paper was flexible and could be affixed to a shaped surface such as a wall using a wallpaper adhesive. Also it could be cut into suitable pieces with scissors etc. Furthermore, a long length of the coated paper could be rolled up for storage purposes in a similar fashion to wallpaper. Essentially, however, it was necessary in order to retain the flexible characteristics of the material to store it in the dark.

Samples of the material were cured to a hard rigid material by exposure for 1 hour to a Phillips 125W MPR mercury vapour lamp; by exposure to sunlight for 4 hours; or by exposure to bright daylight for 8 hours.

After the coating had been cured, the polyethylene foil was stripped therefrom.

EXAMPLE 2

The following ingredients were mixed together to form a slurry:

| | |
|---|---|
| Polyvinyl Chloride (*Corvic R46/88) | 20 parts |
| 1,4 Butylene glycol diacrylate | 12 parts |
| Benzil | 0.03 parts |
| Dimethylamino ethyl methacrylate | 0.03 parts |

The slurry was spread on to a paper sheet. A cover sheet of polyethylene terephthalate was lightly laminated to the coating.

The laminate was placed on a hot plate at 180°C. At first the mixture partly gelled and then it became molten. At this point the laminate was removed from the hot plate and the molten polymer was reduced in thickness by passing the laminate between two rotating rollers.

Though the laminate was not as flexible as in previous Examples, because the sheet of polyethylene terephthalate is relatively inextensible, it, nevertheless, could be adhered to a shaped surface and could be cut into smaller pieces with scissors.

Samples of the sheet were cured in the same way as in Example 1.

EXAMPLE 3

This Example is specific to the use of a paste grade of polyvinyl chloride i.e. a grade of polyvinyl chloride of fine particle size which has a structure such that the particle is not swollen appreciably by plasticising materials at room temperature, but will only imbibe these, so that gelling occurs when the plasticised polymer is heated to an elevated temperature.

A mixture is formed from the following ingredients:

| | |
|---|---|
| Polyvinyl Chloride (*Corvic P65/55) | 20 parts |
| Tri-methylol propane tri-methacrylate | 12 parts |
| Benzil | 0.03 parts |
| Diethanolamine | 0.03 parts |

The mixture was stirred and vacuum degassed and was then doctored on to a wallpaper base to a thickness of 0.020 cm. The coated paper was then placed on a hot plate at 150°C until gellation occurred. (Excessive heating was avoided to ensure that thermal polymerisation of the monomer did not occur).

Desirably the gelled coating is covered with a sheet of polyethylene to exclude air from the coating.

The coated paper had the usual properties associated with a wallcovering. It was sufficiently flexible to manipulate around corners of a wall or other support surface; it could be cut with scissors; it could be rolled up. Of necessity the coated paper has to be stored in the dark in order to retain its flexible properties.

The coating can be cured into a hard rigid coating by exposure to actinic light as in the preceding Examples.

Samples of the coated paper after being subjected to varying curing conditions were tested for hardness by means of a Wallace hardness test apparatus. This measures the indentation of a ball-tipped probe, 1.5 mm diameter, into the sample under a constant 300 gram load. Readings were taken 15 seconds after the load had been applied. The indentations obtained were inversely related to the hardness of the coating.

The results obtained were as follows:

| Curing conditions | Indentation |
|---|---|
| Uncured | 0.06 mms |
| After 1 hr under a Phillips 125w MPR lamp at 25 cms distance | 0.03 mms |
| After 5 hrs under a Phillips 125w MPR lamp at 25 cms distance | 0.025 mms |

As a comparison, a sample of a conventional polyvinyl chloride coated wallcovering sold by Imperial Chemical Industires Limited under the Registered Trade Mark "Vymura" was tested for hardness in a similar way and found to give an indentation of 0.06 mms which corresponds closely to the uncured sample. It is apparent, therefore, that the cured samples have a hardness far in excess of the Vymura sample.

It will have been reslised that the above tests were carried out on samples which have been cured under artificial light. The reason for this is that the intensity of sunlight and daylight varies considerably. Nevertheless similar results could be obtained by exposure to sunlight for 4 hours or bright daylight for 8 hours.

Apart from having a superior hardness, the cured coatings of the above samples also exhibit an improved resistance to staining in comparison with Vymura. To demonstrate this a paste of carbon black and calcium carbonate was formed in cooking oil and the paste applied to the coated surface of a sample of Vymura and a cured sample made above. After 3 weeks, the deposit on the cured sample could be removed by rubbing with a soapy cloth without leaving a stain, whereas with the Vymura sample, some of the particles had been forced into the coating by rubbing with the cloth leaving a permanent strain.

We claim:

1. A decorative sheet material comprising a flexible sheet material provided on its decorative surface with a flexible coating such that the decorative sheet material is sufficiently flexible to allow it to be rolled up for storage without damage to said coating, said flexible coating having a thickness in excess of 0.0025 centimeters and being an organic material which is curable on exposure to actinic light, said organic material being a blend of a thermoplastic polymer and one or more ethylenically unsaturated monomers which are capable of being polymerised by free radical addition polymerisation in the presence of a photosensitive catalyst on exposure of the blend to actinic light, the coated sheet being rolled up in the absence of actinic light whereby when the coated sheet is unrolled and attached to a wall or other surface so exposing the coating to actinic light a less flexible coating on said flexible sheet results.

2. A flexible sheet material according to claim 1 wherein said sheet material is provided with a single or multicolour print which is covered by said flexible coating, the flexible coating being transparent.

3. A flexible sheet material according to claim 2 in which the flexible transparent coating has been embossed.

4. A sheet material according to claim 1 in which the monomer plasticizes the polymer and which on exposure to actinic light is polymerised so that the cured coating so formed becomes a blend of two polymers.

5. A decorative sheet material comprising a flexible sheet material provided on its decorative surface with a flexible coating such that the decorative sheet material is sufficiently flexible to allow it to be rolled up for storage without damage to said coating, said flexible coating being gelled and having a thickness in excess of 0.0025 centimeters and comprising a thermoplastic polymer which contains, as plasticiser, one or more ethylenically unsaturated monomeric materials and a photosensitive catalyst for initiating free radical addition polymerisation of the monomeric materials on exposure of the coating to actinic light, the coated sheet being rolled up in the absence of actinic light whereby when the coated sheet is unrolled and attached to a wall or other surface, so exposing the coating to actinic light, the monomeric materials polymerise and reduce the flexibility of the coating on said flexible sheet.

* * * * *